United States Patent
Shin et al.

(10) Patent No.: US 7,697,437 B2
(45) Date of Patent: Apr. 13, 2010

(54) ROUTE DETERMINING METHOD IN A MULTI PROTOCOL LABEL SWITCHING NETWORK

(75) Inventors: Yong Sik Shin, Seoul (KR); Si Hoon Ryu, Sungnam-si (KR); Dong Hahk Lee, Sungnam-si (KR); Jong Tae Ihm, Sungnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 2281 days.

(21) Appl. No.: 10/175,855

(22) Filed: Jun. 21, 2002

(65) Prior Publication Data
US 2003/0002444 A1 Jan. 2, 2003

(30) Foreign Application Priority Data
Jun. 21, 2001 (KR) .............................. 2001-35578
Oct. 24, 2001 (KR) .............................. 2001-65799

(51) Int. Cl.
H04L 12/28 (2006.01)
(52) U.S. Cl. ....................................... 370/238; 370/254
(58) Field of Classification Search ................ 370/230, 370/230.1, 238, 238.1, 235, 237, 254–256
See application file for complete search history.

(56) References Cited
U.S. PATENT DOCUMENTS

| | | | | |
|---|---|---|---|---|
| 6,661,797 B1 * | 12/2003 | Goel et al. | ............. | 370/395.21 |
| 6,925,061 B2 * | 8/2005 | Lee et al. | ..................... | 370/238 |
| 6,956,821 B2 * | 10/2005 | Szviatovszki et al. | ....... | 370/237 |
| 7,027,448 B2 * | 4/2006 | Feldmann et al. | ........... | 370/401 |
| 7,065,045 B2 * | 6/2006 | Jeffries et al. | ................ | 370/230 |
| 2003/0058798 A1 * | 3/2003 | Fleischer et al. | ............ | 370/238 |

OTHER PUBLICATIONS

MATE: MPLS adaptive traffic engineering Elwalid, A.; Jin, C.; Low, S.; Widjaja, I.; INFOCOM 2001. Twentieth Annual Joint Conference of the IEEE Computer and Communications Societies. Proceedings. IEEE vol. 3, Apr. 22-26 2001 pp. 1300-1309 vol. 3.*

* cited by examiner

Primary Examiner—Pankaj Kumar
Assistant Examiner—Marcus R Smith
(74) Attorney, Agent, or Firm—Lowe Hauptman Ham & Berner, LLP

(57) ABSTRACT

The present invention relates to a method of determining at least one traffic route in an MPLS (Multi-Protocol Label Switching) network. In this route determining method, when a traffic is arrived at an ingress edge router, the edge router removes links of remaining capacity below the traffic demand from all links of a given MPLS network to produce the first network topology, calculates distance of every link of the first network topology based on current traffic flowing each link and the traffic demand, determines the first route for the traffic demand based on the calculated distance information; removes links of remaining capacity below the traffic demand and links belonging to the first route from the MPLS network to produce the second network topology, calculates every link distance of the second topology based on current traffic flowing each link and the traffic demand, determines the second route for the traffic demand based on the distance information obtained from the second topology, partitions the arrived traffic into two portions, and allocates the two portions to the first and the second route, respectively.

22 Claims, 4 Drawing Sheets

ROUTE DETERMINING METHOD IN A MULTI PROTOCOL LABEL SWITCHING NETWORK

BACKGROUND OF THE INVENTION

1. Field of the Invention

The present invention relates to a method of determining at least one traffic route in an MPLS (Multi-Protocol Label Switching) network.

2. Description of the Related Art

An MPLS ensures quality of service (QoS) for a traffic transported through an IP (Internet Protocol) network and efficient use of network resources. Therefore, it is spotlighted in traffic engineering field.

The MPLS traffic engineering determines an LSP (Label Switched Path) in various ways to appropriately accept a variety of QoS demands for users' IP packets. The LSP is a point-to-point (PTP) path connecting from an ingress to an egress edge router.

The IETF (Internet Engineering Task Force) committee is under discussion about reroute, protection switching, and fast reroute in determining an LSP to prepare against unexpected network fault. The methods of protection switching and fast reroute reserve a backup path for a primary LSP to prepare against network fault. However, when a backup path is reserved, some bandwidth of the backup path is reserved and is not able to be used for other traffic.

Another method has been proposed to resolve such a drawback. In this method, a reserved backup path is used for other traffic demanding low QoS in case of normally-operative network and for a traffic of primary LSP in case of faulty network.

Despite such an improved method, new methods are still demanded to prepare for network fault while reducing a bandwidth allocated for a backup path as possible as it can.

In addition, conventional methods consider only current traffic being routed through network as link or node cost in LSP determination. In other words, they do not consider traffic to be routed at all, which restricts the most optimal path determination from an overall network point of view. Therefore, such conventional methods reveal low efficiency of traffic engineering.

In the meantime, due to rapid growth of an IP base network, various multimedia services such as VoIP, VOD, AOD, on-line movie, and video conference are being demanded. Many of those multi-media services require a point-to-multipoint (PTM) tree. If a PTM multimedia service is provided through PTP LSPs, use efficiency of network resources becomes worse and/or management of QoS becomes not easy. This is because multicast traffic is routed through a unicast way.

In the Internet proposal room of the IETF committee, many ways to distribute MPLS label are being listed up. Those many ways use PIM-SM or PIM-DM which is conventional multicast IP protocol. Besides the proposed many ways, MPLS multicasting way is being standardized in the IETF.

However, since tree determining methods of existing multicast protocols proposed until now are all receiver-based, it is not easy to reflect intentions of a service provider or users appropriately. Furthermore, a multicast traffic transporting method using an existing PTP path determining way can not use network resources efficiently, which results in deterioration of service quality.

In addition, all existing tree determining methods consider only current network state, namely they do not consider traffic to be routed at all, which causes a problem that traffic load is not distributed uniformly over an overall network.

SUMMARY OF THE INVENTION

It is an object of the present invention to provide a traffic route determining method in an MPLS network which determines more than one traffic route at an originating node in consideration of current network state and a traffic demand to be routed.

It is another object of the present invention to provide a traffic route determining method in an MPLS network which, when two primary and one backup LSP for a PTP are to be determined to achieve stable PTP routing of a traffic demanding relatively high QoS, determines optimal traffic paths from a cost point of view while reducing a reserved bandwidth of a backup path as possible as it can and preparing efficiently for network fault.

It is another object of the present invention to provide a traffic route determining method in an MPLS network which distributes a traffic demand optimally to two determined LSTs (Label Switched Trees) for a PTM and equilibrates network load over an overall network at same time by considering a traffic demand to be routed as well as current network state.

A method of determining routes in an MPLS network in accordance with the present invention is characterized in that it comprises the steps of: removing links of remaining capacity below a traffic demand to be routed from all links of the MPLS network to produce the first network topology; calculating distance of every link of the first network topology based on current traffic flowing each link and the traffic demand; determining the first route for the traffic demand based on the calculated distance information; removing links of remaining capacity below the traffic demand and links belonging to the determined first route from all links of the MPLS network to produce the second network topology; calculating distance of every link of the second network topology based on current traffic flowing each link and the traffic demand; determining the second route for the traffic demand based on the distance information obtained from the second network topology; and partitioning the traffic demand into two portions and allocating the two portions to the first and the second route, respectively.

Another method of determining routes in an MPLS network in accordance with the present invention is characterized in that it comprises the steps of: removing links of remaining capacity below a traffic demand to be routed from all links of the MPLS network to produce the first network topology; calculating distance of every link of the first network topology based on current traffic flowing each link and the traffic demand; determining the first route for the traffic demand based on the calculated distance information; removing links of remaining capacity below zero and/or links belonging to the determined first route from all links of the MPLS network to produce the second network topology; calculating distance of every link of the second network topology based on current traffic flowing each link and the traffic demand; determining the second route for the traffic demand based on the distance information obtained from the second network topology; and partitioning the traffic demand into two portions and allocating the two portions to the first and the second route, respectively.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein.

DETAILED DESCRIPTION OF THE PREFERRED EMBODIMENT

In order that the invention may be fully understood, a preferred embodiment thereof will now be described with reference to the accompanying drawings.

Figure 1:
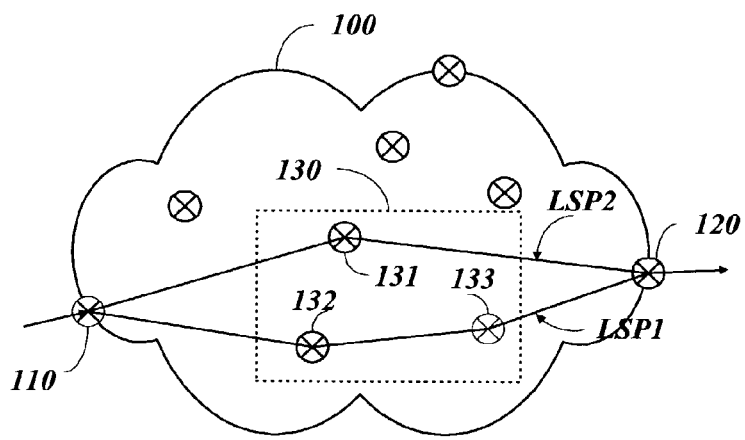
FIG. 1 is an illustrative MPLS network composed of several routers.

FIG. 1 is an illustrative MPLS network 100 composed of several routers. Among those routers, a router functioning an entrance of the network 100 for an arbitrary data traffic is called ingress LER (Label Edge Router) while a router functioning as an exit of the network 100 is called egress LER. And, a router, located on a path from an ingress to an egress LER, functioning as a relay node is called LSR (Label Switching Router). In FIG. 1, The numeral 110, 120, and 130 represent ingress LER, egress LER, and LSRs, respectively. A path connected from the ingress 110 to egress LER 120 through no or at least one LSR 130 is called 'LSP'. In FIG. 1, two LSPs 'LSP1' and 'LSP2' are marked. The LSP 'LSP1' is a path of 110→132→133→120 and the LSP 'LSP2' a path of 110→131→120. Such LSPs are determined for an input traffic at the ingress LER 110.

Figure 2:
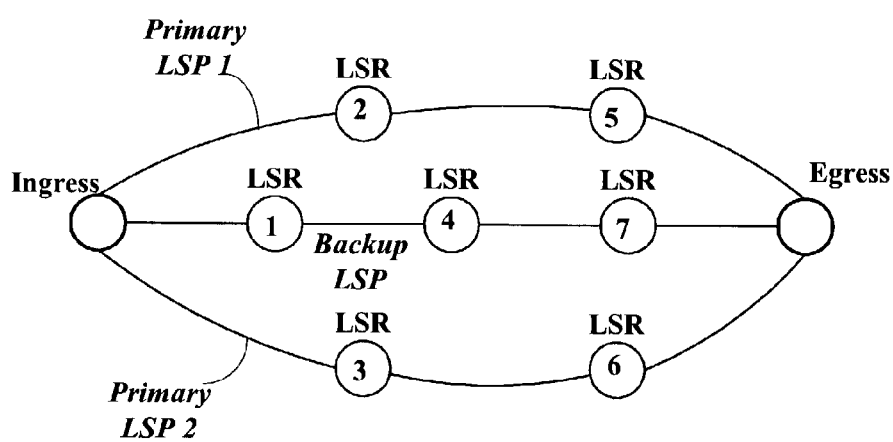
FIG. 2 is another illustrative MPLS network in which two primary LSPs (Label Switched Paths) and a single backup LSP are established for a PTP (point-to-point) traffic in accordance with the present invention.

FIG. 2 is another illustrative MPLS network in which two primary LSPs 'LSP1' and 'LSP2' and a single backup LSP are established for a PTP traffic to prepare protection switching. In FIG. 2, one primary LSP 'LSP1' is a path of Ingress→LSR2→LSR5→Egress, the other LSP2 Ingress→LSR3→LSR6→Egress, and the backup LSP Ingress=LSR1→LSR4→LSR7→Egress. The backup LSP is used as a roundabout path for traffic to be routed through the primary LSPs when they become in fault. The two primary LSPs share traffic demand optimally and the backup LSP reserves bandwidth for a roundabout path as much as the bandwidth of large part of the shared traffic.

Figure 3:
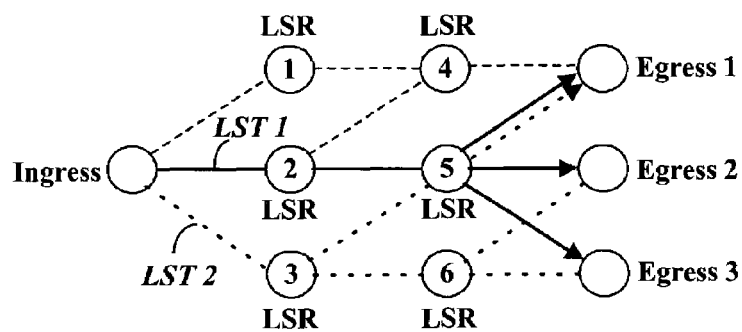
FIG. 3 is another illustrative MPLS network in which two LSTs (Label Switched Trees) are established for a multicast traffic in accordance with the present invention.

FIG. 3 is another illustrative MPLS network in which two LSTs (Label Switched Trees) are established for a multicast traffic. FIG. 3 illustrates that an ingress LER has determined two LSTs 'LST1' and 'LST2', equivalent to multiple LSPs, for an input multicast traffic destined for three egress LERs 'Egress1', 'Egress2', and 'Egress3'.

The first LST 'LST1', drawn as thick sold line, is a tree of Ingress→LSR2→LSR5→Egress1, 2, 3 and the second LST 'LST2', drawn as thick dotted line, is a tree of Ingress→LSR3→LSR5→Egress1 and Ingress→LSR3→LSR6→Egress2,3. The two LSTs are determined by the ingress LER as aforementioned when routing of a multicast traffic is demanded.

For example, when multicast traffic is to be routed from the ingress LER to three egress ones 'Egresses 1 to 3' the ingress LER determines the two LSTs and distributes the multicast traffic to the two LSTs at a certain ratio, e.g., 6 to 4.

In the MPLS network of FIG. 2, the LSPs are determined with disjoint rule, however, in FIG. 3, the LSTs are determined with no disjoint rule.

Figure 4:
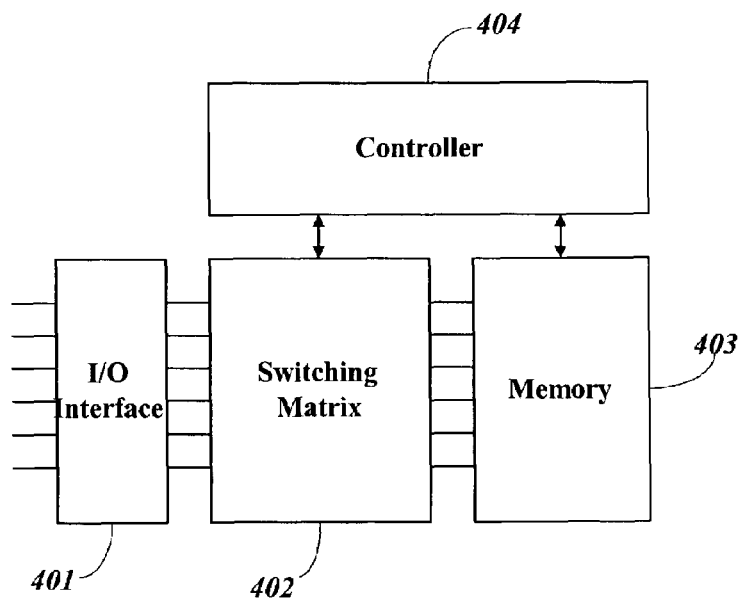
FIG. 4 is a simplified block diagram of an ingress LER (Label Edge Router) to determine LSPs or LSTs in accordance with the present invention.

FIG. 4 is a simplified block diagram of an ingress LER to determine LSPs or LSTs in accordance with the present invention. The ingress LER of FIG. 4 comprises an I/O interface 401, equipped with many I/O ports, receiving/transmitting data trough the I/O ports; a switching matrix 402 setting output path of each input data to direct data toward its destination; a memory 403 storing a routing table; and a controller 404 constructing the routing table, and controlling the path setting of the switching matrix 402 based on the routing table to route input traffic to a suitable adjacent node.

The controller 404 constructs the routing table according to below-explained route determining manners, and stores it into the memory 403.

Figure 5:
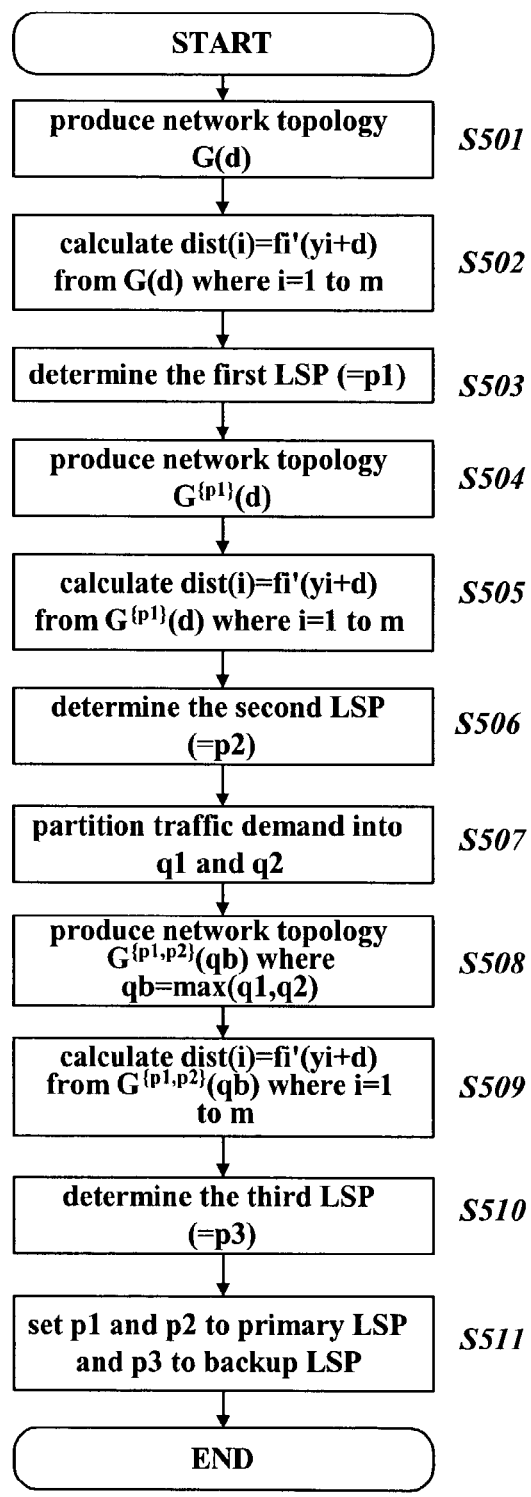
FIG. 5 is a flow diagram of an embodiment of a route determining method in accordance with the present invention.

FIG. 5 is a flow diagram of an embodiment of a route determining method in accordance with the present invention. The embodiment of FIG. 5 is to determine two primary LSPs and a backup LSP. It is supposed that an ingress LER conducting the embodiment knows network topology, cost function (e.g., delay function), initial and remaining capacity of every link, and traffic demand to assign LSP for (namely, traffic load to be routed into network). If necessary, it is also supposed that all LSRs on an MPLS network know that information.

Notations used for explanation below are defined as follows. G or G(m,n) represents a network at the time when an LSP is to be determined for a new traffic where m is the number of total links and n the number of nodes; $G^{(p)}(z)$ represents a network G from which links of remaining capacity below z and links belonging to the path p are removed; $y_i$ is current traffic flow on link i (=1, 2, ..., m); d is a traffic demand to be routed; $f_i(x_1)$ is a cost in the event that traffic flow $x_1$ is loaded on link i; $f_1'(x_1)$ is a cost increasing rate per unit flow in the event that traffic flow $x_1$ is loaded on link i; dist(i) is a conceptual distance of link i; and $p_k$ is the k-th primary LSP where k=1 and 2.

First, links of remaining capacity (marked '$c_i$' hereinafter) below the traffic demand d are removed from all links of the MPLS network 100 (S501). A link means between two adjacent nodes, e.g., lines between 110 and 131, 132 and 133, etc. In the step S501 of FIG. 5, G(d) represents an MPLS network G(m,n) from which links of $c_1$ below d have been removed.

Next, $dist_1(i)$ is calculated for each link i of the network G(d) based on $Y_i$ of each link i and the traffic demand d. If a delay function is used as the cost function $f_1(x_i)$, the $dist_1(i)$ is defined as a derivative of $f_i(x_i)$, namely, $f_i'(x_i)$ where $x_1$ is replaced with $y_i+d$. Therefore, every link distance of network G(d) is obtained from the following Eq. (1) (S502).

$$dist_1(i) = f_i'(y_i + d) = \frac{tc_i - y_i}{(tc_{i-}(y_i + d))^2} = \frac{c_i}{(c_i - d)^2} \quad \text{Eq. (1)}$$

In Eq. (1), i represents link index, namely, from 1 to m where m is the number of total links, dist(i) is distance of link i, $tc_1$ and $c_1$ are initial and remaining capacity, respectively, of link i. Therefore, $c_i$ is equal to '$tc_1-y_1$'. In addition, if delay at link i is expressed by $f_i(x_1)$ where $x_1$ is traffic flowing link i, $f_i(x_1)=x_i/(tc_i-x_i)$ and its derivative $f_i'(x_i)=c_i/(tc_i-x_i)^2$. Therefore, Eq. (1) is derived by replacing variable $x_i$ with $y_i+d$ in the derivative $f_i'(x_i)$.

$f_1'(x_1)$ is a function of cost increasing rate per unit flow in the event that traffic flow $x_1$ is flowed on link i.

The cost function may not use delay function. If a function gives conceptual distance of every link for $y_1+d$, that function can be used as cost function of the present invention. Especially, if a nonlinear function is adopted for cost versus traffic flow of a link, a link of minimum cost can be found.

Next, a PTP path p1(=LSP1) is determined based on the information $dist_1(i)$ of every link (S503). The determined PTP path is a link set of which distance sum is smallest from ingress to egress LER.

After the first path LSP1 is determined at the step S503, another network topology is constructed as follows.

Namely, links of $c_i$ below the traffic demand d and links belonging to the first path p1(=LSP1) are removed from all links of the MPLS network 100 (S504). Thusly-constructed network is expressed as $G^{\{p1\}}(d)$.

Next, distance $dist_2(i)$ of every link of new network topology $G^{\{p1\}}(d)$ is calculated again from Eq. (2) based on $y_i$ of each link i and the traffic demand d (S505). Eq. (2) is totally same with Eq. (1) because delay is selected as cost.

$$dist_2(i) = f_i'(y_i + d) = \frac{tc_i - y_i}{(tc_i - (y_i + d))^2} = \frac{c_i}{(c_i - d)^2} \quad \text{Eq. (2)}$$

Afterwards, the second PTP path p2(=LSP2) is determined based on the information $dist_2(i)$ of every link calculated in the step S505 (S506). The determined second PTP path is also a link set of which distance sum is smallest the same as the first path.

Then, the ingress LER calculates dividing portions $q_1$ and $q_2$ of the traffic demand d (=$q_1+q_2$). The divided traffic $q_1$ and $q_2$ are chosen to values to make the function of Eq. (3) smallest (S507).

$$g(q1, q2) = \sum_{i=1}^{m} f_i(q_1\delta_i^1 + q_2\delta_i^2) \quad \text{Eq. (3)}$$

where $q_1, q_2 > 0$, $c_i \geq q_1\delta_i^1 + q_2\delta_i^2 \geq 0$, and $\delta_i^k$ is 1 if link i belongs to the determined path $p_k$ (k=1,2).

Finally, a backup LSP will be determined from links being capable of carrying a large portion among divided traffic $q_1$ and $q_2$. For this backup LSP determination, links of $c_i$ below $q_b$=max($q_1, q_2$) and links belonging to the first path $p_1$(=LSP1) or $p_2$(=LSP2) are removed from all links of the MPLS network 100 (S508). Thusly-constructed network is expressed as $G^{\{p1,p2\}}(q_b)$.

Next, distance $dist_3(i)$ of every link of the network topology $G^{\{p1,p2\}}(q_b)$ is calculated once more with the same manner as in the above primary path determination based on $y_i$ of each link i and the traffic demand $q_b$ (S509). The value substituted for $x_i$ of the cost function $f_i(x_i)$ is $y_i+q_b$.

Afterwards, the third PTP path $p_b$(=LSP3) is determined based on the information $dist_3(i)$ of every link calculated in the step S509 (S510). The determined third PTP path is also a link set of which distance sum is smallest the same as the first path.

Among the three paths, the ingress LER sets the first 'LSP1' and the second path 'LSP2' to primary LSPs and the third path 'LSP3' to backup LSP (S511).

After necessary LSPs are determined completely, the ingress LER allocates the divided traffic $q_1$ and $q_2$ to the paths 'LSP1' and 'LSP2', respectively.

Figure 6:
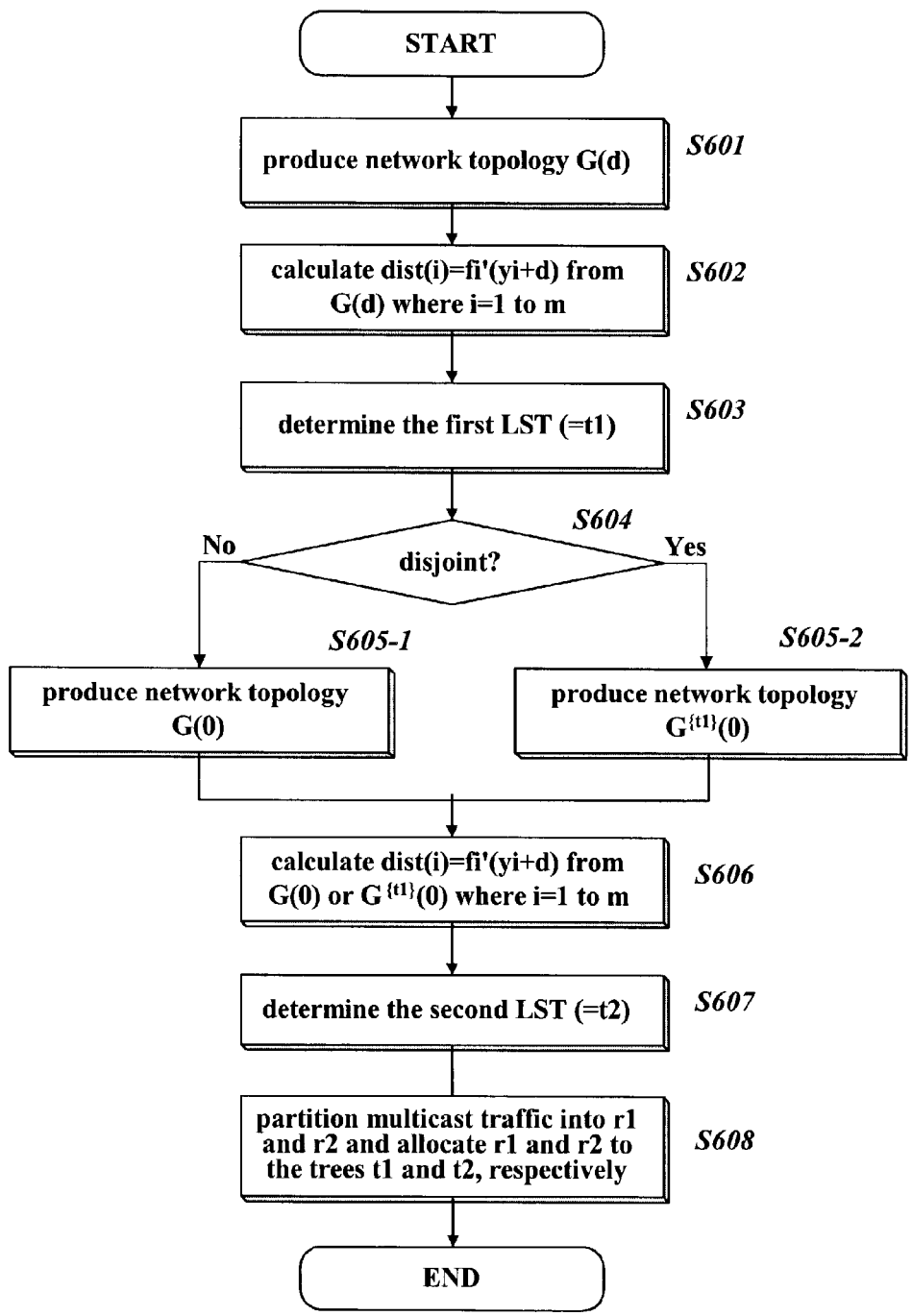
FIG. 6 is a flow diagram of another embodiment of a route determining method in accordance with the present invention.

FIG. 6 is a flow diagram of another embodiment of a route determining method in accordance with the present invention.

It is also supposed that an ingress LER conducting this embodiment knows network topology, cost function (e.g., delay function), initial and remaining capacity $c_i$ of every link, and multicast traffic demand d' to assign LST for (namely, multicast traffic load to be routed). If necessary, it is also supposed that all LSRs on an MPLS network know that information and are able to copy label and traffic.

First, links of remaining capacity $c_i$ below the multicast traffic demand d' are removed from all links of the MPLS network G 100 to create new network topology G(d') (S601).

Next, $dist_a(i)$ is calculated for each link i of the network G(d') based on $y_i$ of each link i and the multicast traffic demand d' (S602) If a delay function is adopted as a cost function $f_i(x_i)$, the Eq. (1) can be used for this distance calculation.

Next, the first PTM tree t1(=LST1) is determined on the network G(d') based on the information $dist_1(i)$ of every link (S603). In this tree determination, it is preferable to select a tree of which distance sum from ingress to egress LER is smaller than a predetermined threshold. The reason not to find a tree of the smallest distance sum is that huge computation power may be required. The threshold is set such that a tree of relatively small distance sum can be obtained with allowable computing load.

After the first tree is determined, the determination rule of next tree is checked (S604). If the rule is set to 'no disjoint', the network G(0) is constructed from the network G where the multicast traffic d' is supposedly loaded to links belonging to the determined tree t1(=LST1) (S605-1). The network G(0) means a network composed of links of $c_i$ not below zero.

If the rule is set to 'disjoint', network topology $G^{\{t1\}}(0)$ is constructed from the network G (S605-2).

Next, distance $dist_b(i)$ of every link of the new network topology G(0) or $G^{\{t1\}}(0)$ is calculated again based on $y_i$ of each link i and the traffic demand d' (S606). Since G(0) and $G^{\{t1\}}(0)$ are all subset of G(d'), the distance set calculated from the $dist_a(i)$ may be re-used instead of calculating $dist_b(i)$ for G(0) or $G^{\{t1\}}(0)$ one by one.

Afterwards, the second PTM tree t2(=LST2) is determined based on the information $dist_b(i)$ of every link the same as the first PTM tree (S607).

Finally, the ingress LER calculates dividing portions $r_1$ and $r_2$ of the multicast traffic demand d' (=$r_1+r_2$). The divided traffics $r_1$ and $r_2$ are chosen to values to make the function of Eq. (4) smallest.

$$g(r_1, r_2) = \sum_{i=1}^{m} f_i(r_1\delta_i^1 + r_2\delta_i^2) \quad \text{Eq. (4)}$$

where $r_1, r_2 > 0$, $c_i \geq r_1\delta_i^1 + r_2\delta_i^2 \geq 0$, and $\delta_i^k$ is 1 if link i belongs to the determined tree $t_k$ (k=1,2).

After two LSTs are determined completely, the ingress LER allocates the divided multicast traffic $r_1$ and $r_2$ to the trees 'LST1' and 'LST2', respectively (S608).

The above-explained route determining method in an MPLS network according to the present invention, which routes PTP or PTM traffic through a plurality of primary paths or trees, can reduce overall cost (transporting cost, traffic delay, etc) remarkably, cope with network fault efficiently, and improve traffic viability against network fault if a backup path is established disjointedly with primary paths.

Furthermore, the present method can reduce cost taken in routing multicast traffic and improve viability of multicast traffic against network fault if plural trees are established disjointedly each other. This is because when one of the plural trees becomes fault not all but some of multicast traffic is lost. However, entire multicast traffic is lost in a conventional method using one tree for routing a multicast traffic.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of determining routes in an MPLS (Multi-Protocol Label Switching) network, said method comprising the steps of:
    (a) removing links of remaining capacity below a traffic demand to be routed from all links of the MPLS network;
    (b) calculating a distance value of every link of the network constructed in said step (a), based on a current traffic of said link and the traffic demand;
    (c) determining a first route for the traffic demand based on the calculated distance values;
    (d) removing links of remaining capacity below the traffic demand and links belonging to the determined first route from all links of the MPLS network;
    (e) calculating a distance value of every link of the network constructed in said step (d), based on a current traffic of said link and the traffic demand;
    (f) determining a second route for the traffic demand based on the distance values obtained in said step (e); and
    (g) partitioning the traffic demand into two portions and allocating the two portions to the first route and the second route, respectively.

2. The method of claim 1, wherein in at least one of said steps (b) and (e), the distance value of each link is obtained by replacing variable x of a given cost function f(x) with the current traffic of said link and the traffic demand.

3. The method of claim 1, wherein said steps (a) to (c) are conducted by an ingress edge router through which the traffic demand enters the MPLS network.

4. The method of claim 1, further comprising the steps of:
    (h) removing links of remaining capacity below the traffic demand and links belonging to the first or the second route from all links of the MPLS network;
    (i) calculating a distance value of every link of the network constructed in said step (h), based on the current traffic of said link and one selected from the partitioned two portions; and
    (j) determining a backup route for the traffic demand based on the distance values calculated in said step (i).

5. The method of claim 4, wherein said selected partitioned portion is larger than the other.

6. The method of claim 1, wherein the two partitioned portions are $q_1$ and $q_2$ that make a function of $$g(q1, q2) = \sum_{i=1}^{m} f_i(q_1 \delta_i^1 + q_2 \delta_i^2)$$

smallest in the event that $f_i(x)$ is given as a cost function of link i, wherein $q_1$, $q_2 > 0$, $c_1 \leq q_1 \delta_i^1 + q_2 \delta_i^2 \geq 0$, is 1 if link i belongs to the determined route $p_k$ (k=1, 2).

7. The method of claim 1, wherein the determined first or second route comprises a set of links from an ingress edge router to an egress edge router of the MPLS network;
    said set of links having the smallest sum of the associated distance values for the traffic demand.

8. The method of claim 1, wherein the determined first or second route comprises a set of links from an ingress edge router to an egress edge router of the MPLS network;
    said set of links having a sum of the associated distance values for the traffic demand, wherein said sum is below a predetermined threshold.

9. The method of claim 1, wherein the determined first or second route includes at least one path caffying a multicast traffic.

10. A method of determining routes in an MPLS (Multi-Protocol Label Switching) network, said method comprising the steps of:
    (a) removing links of remaining capacity below a traffic demand to be routed from all links of the MPLS network;
    (b) calculating a distance value of every link of the network constructed in said step (a), based on a current traffic of said link and the traffic demand; and
    (c) determining a first route for the traffic demand based on the calculated distance values;
    wherein the distance value of each link is calculated from $c_i/(c_i-d)^2$ where i is link index, $c_i$ is the remaining capacity of link i, and d is the traffic demand.

11. A method of determining routes in an MPLS (Multi-Protocol Label Switching) network, said method comprising the steps of:
    (a) removing links of remaining capacity below a traffic demand to be routed from all links of the MPLS network;
    (b) calculating a distance value of every link of the network constructed in said step (a), based on a current traffic of said link and the traffic demand;
    (c) determining a first route for the traffic demand based on the calculated distance values;
    (d) removing links of remaining capacity below zero from all links of the MPLS network;
    (e) calculating a distance value of every link of the network constructed in said step (d), based on a current traffic of said link and the traffic demand;
    (f) determining a second route for the traffic demand based on the distance values obtained in said step (e); and
    (g) partitioning the traffic demand into two portions and allocating the two portions to the first route and the second route, respectively.

12. The method of claim 11,
    wherein said step (d) further comprises removing links belonging to the determined first route from all links of the MPLS network.

13. The method of claim 12, wherein in at least one of said steps (b) and (e), the distance value of each link is obtained by replacing variable x of a given cost function f(x) with the cuffent traffic of said link and the traffic demand.

14. The method of claim 12, wherein said method is conducted by an ingress edge router through which the traffic demand enters the MPLS network.

15. The method of claim 12, wherein the determined first or second route comprises a set of links from an ingress edge router to an egress edge router of the MPLS network;

said set of links having the smallest sum of the associated distance values for the traffic demand.

16. The method of claim 12, wherein the determined first or second route comprises a set of links from an ingress edge router to an egress edge router of the MPLS network;
said set of links having a sum of the associated distance values for the traffic demand, wherein said sum is below a predetermined threshold.

17. The method of claim 12, wherein the determined first or second route includes at least one path caffying a multicast traffic.

18. The method of claim 11, wherein in at least one of said steps (b) and (e), the distance value of each link is obtained by replacing variable x of a given cost function f(x) with the cuffent traffic of said link and the traffic demand.

19. The method of claim 11, wherein said method is conducted by an ingress edge router through which the traffic demand enters the MPLS network.

20. The method of claim 11, wherein the determined first or second route comprises a set of links from an ingress edge router to an egress edge router of the MPLS network;
said set of links having the smallest sum of the associated distance values for the traffic demand.

21. The method of claim 11, wherein the determined first or second route comprises a set of links from an ingress edge router to an egress edge router of the MPLS network;
said set of links having a sum of the associated distance values for the traffic demand, wherein said sum is below a predetermined threshold.

22. The method of claim 11, wherein the determined first or second route includes at least one path caffying a multicast traffic.

* * * * *